Patented July 3, 1934

1,964,771

UNITED STATES PATENT OFFICE 1,964,771

MANUFACTURE OF VULCANIZED RUBBER PRODUCTS

Milton O. Schur, Berlin, N. H., assignor to Brown Company, Berlin, N. H., a corporation of Maine No Drawing. Application June 17, 1931, Serial No. 545,082

4 Claims. (Cl. 18—53)

The subject of this invention is the processing of latex or similar dispersions of rubber, more particularly from the aspect of impregnating porous objects therewith and of producing other products in which the rubber appears in a vulcanized condition possessing optimum properties. In a more narrow sense, the invention devolves about the manufacture of artificial leather of the type in which a bibulous fibrous foundation, for instance, a web of interfelted fibers produced on a paper machine serves as the carrier sheet or skeleton for a vulcanized rubber reinforcing phase derived from latex or similar dispersed rubber. For a great many years, it has been known that artificial leather suitable for use in making parts of footwear or in other situations can be made by impregnating a flexible foundation fiber, e. g., a loosely interfelted wood pulp sheet, with rubber latex or liquid rubber of similar nature, and then drying the impregnated foundation in order to set the rubber as a more or less continuous solid phase, which imparts such qualities as toughness, elasticity, stretchability, and other leather-simulating qualities thereto. In order that the impregnated foundation more closely approximate natural leather, the rubber phase is preferably subjected to a vulcanizing operation which has the effect of increasing such qualities as resistance against water, resistance to fracture through continued flexing, resistance to permanent deformation when stretched, etc. The curing of the rubber may be effected in many ways, but within recent years it has been proposed to start with a vulcanized rubber dispersion, such as vulcanized latex, which, upon drying, sets directly as a more or less vulcanized rubber phase, depending upon the conditions under which vulcanization was effected. The vulcanization of latex, while preserving it in an uncoagulated state entirely suitable for use as an impregnant, is now well known in the art, and is fully described, for example, in United States Letters Patent No. 1,443,149, issued January 23, 1923, and No. 1,682,857, issued September 4, 1928, to P. Schidrowitz. In actual practice, the vulcanized latex is applied to the porous object to be impregnated directly as it comes from the vulcanizer or intermediate storage tanks, but preferably as a blend of several batches. In experimenting to overcome certain defects in artificial leather made hitherto and which militate against the use of artificial leather, as, for example, in shoe uppers and in similar situations, where wearing qualities and resistance to permanent deformation are important features, I discovered that excellent results could be obtained if the pre-vulcanized rubber dispersion were compounded with a reagent or reagents which would modify or further the vulcanization of the rubber particles after the bibulous web had been impregnated, that is, during the drying operation and/or during subsequent heating of the dried material. For some reason which is not entirely clear at present, much better results have been obtained by carrying out my process of vulcanization in two steps, rather than in one, that is, upon the latex alone. Repeated runs have been made, wherein the proportions of vulcanizing ingredients and the vulcanizing conditions relied upon in vulcanizing the rubber dispersion have been varied, but thus far the results of a two-step vulcanization in accordance with my invention have not been equalled. The improvement resides in those important qualities of leather previously mentioned,—namely, resistance of the artificial leather to the action of water (i. e., its maintenance of strength when wet), its resistance to fracture on continued flexing, its resistance to permanent deformation when stretched moderately (i. e., far short of its fracture point), etc. While it may be that with the development of new vulcanization accelerators, the use of hitherto untried combinations of compounding ingredients, or further experimentation with vulcanizing temperatures, my improved results may be realized in one step, nevertheless there are certain advantages attending my two-step process over the known art. In the past, it has been found very desirable to blend several batches of vulcanized dispersion in order to obtain reasonably consistent results in the finished artificial leather, for, owing to the variability in the characteristics of rubber dispersions, such as latex, the results of vulcanizing rubber in such liquid condition were apt to be variable, even though vulcanizing conditions were maintained standard. Even blending, however, unless practised with several large batches, may give inconsistent results. By practising my two-step vulcanizing process, however, I effect a check on the quality of the artificial leather produced, in that if the vulcanization of the dispersion in the first instance has been terminated short of the optimum, the secondary vulcanization during the drying of the impregnated web or afterwards, ensures a more definite end point of vulcanization. It might again be pointed out that vulcanization of the rubber dispersion, for example, latex, is invariably carried out short of reaching optimum cure, so far as concerns the production of artificial leathers. When it is attempted to force the vulcanization of the dispersion too far, the loss of rubber on account of coagulation may become serious; and even neglecting this factor from consideration, the results in the finished leather are short of the expected. In accordance with the present invention, vulcanization of latex may be carried on as has conventionally been the practice; in fact, the vulcanization may even be milder than heretofore, for it is unessential that the latex be given the optimum vulcanization in the first instance. This in itself is clearly an advantage, as the vulcanization of the latex needs less careful superintendence, and a given set-up of apparatus has larger production possibiliites. The prevulcanized latex is then admixed with the agents for promoting the secondary vulcanization to the desired end point, whereupon a suitable bibulous foundation is impregnated with the mixture and the secondary vulcanization is effected in situ in the foundation, during drying or afterwards. When it is attempted to carry out the vulcanization entirely during drying of the impregnated foundation and/or afterwards, the results would be apt to be as variable and unsatisfactory as in an instance where the vulcanization is carried out only in the rubber dispersion. The reasons for this lie in the difficulty of maintaining constantly reproducible conditions of temperature, time, and moisture content in the drier in practice.

While not limited thereto, I shall outline a procedure falling within the purview of the present invention as practised with ammonia-preserved latex as a raw material. The latex may be used at its natural strength, that is, at a solids content of about 36%. There is then mixed into the latex about 1¼% colloidal sulphur, about 2½% colloidal zinc oxide, and a suitable accelerator, for instance about ⅛% of an ultra-accelerator, such as "Pipsol-X" or "Hydrone", all these percentages being based on rubber. The mixture is now slowly and gradually heated under atmospheric pressure, as in a hot-water-jacketed kettle, so that its temperature reaches, say, 70° C. in an hour. The slow application of heat has been found to work successfully, i. e., without coagulation, with many kinds of latices. The temperature is then maintained at 70° for about an hour, when the batch is gradually cooled to about room temperature in a half-hour, through the circulation of cold water through the jacket. During the heating of the batch, ammonia water is added to maintain the ammonia content at about ½ normal. The cooled latex thus prevulcanized and showing no sign of coagulation is ready for receiving additional ingredients, which may include sufficient water to bring its solids content, including its rubber content, down to, say, about 24%, about 1% colloidal sulphur, about 5% colloidal zinc oxide, and about ⅜% to 1% of a suitable ultra-accelerator, such as Pipsol-X or Hydrone. A bibulous fibrous web is then run through this impregnating mixture, preferably in continuous fashion, and is then dried and vulcanized in any suitable way, as in a festoon drier maintained, by way of example, at 180° F. at the entrance or wet end and about 230° to 250° at the exit or dry end. If a web of loosely interfelted, refined wood pulp is being impregnated, the impregnated web is generally lightly squeezed before it enters the drier, so that its absorbed solids content, including rubber, amounts to about 100% to 120%, based on the dry weight of the fiber. In such instance, the dried product is possessed of those qualities rendering it adaptable for use as shoe upper stock, chair covering, and the like. To show precisely the improvement in the quality of a product brought about by the second vulcanizing step, there are tabulated below data for artificial leathers made:

(A) With vulcanized latex to which no vulcanizing chemicals have been added after vulcanization, and (B) Similarly vulcanized latex to which supplementary chemicals have been added in order to realize second-stage vulcanization.

|  | A | B |
|---|---|---|
| Percent solids other than fiber in finished product. | 55 | 55. |
| Permanent set (%) | 25 to 35 | 10 to 20. |
| Ratio wet to dry tensile strength | 25 to 35 | 35 to 50. |
| Resistance to flexing | Variable | Consistently good. |
| Ageing qualities | Variable | Consistently good. |

In the course of my work, I made the surprising discovery that although product A or B may be embossed with striking effects, the retention of the impression was much less permanent in the case or product B. It must be borne in mind that the recovery of the impressed areas takes place relatively slowly, so that while there is ample time to take advantage in the finishing operations of the depth of embossing necessary to permit filling in with different combinations of decorating materials, the finished leather after a day or two loses enough of its original depth of embossing so as to approach more nearly the grain of natural leather. The lower permanence of the impression in the case of product B means a greater resistance toward marring through encounter with sharp edges and corners, the impression made through such encounter disappearing, unless, of course, the fibers have actually been cut. Leathers made according to my process and put into shoe uppers have shown in actual use the improved qualities. Thus, for example, whereas leathers like A "ballooned out" at the vamp in a short while because of the swelling pressure of the foot combined with the softening effect of the perspiration, shoes made up with artificial leathers B behaved so admirably that even after four or five weeks of continued wear under adverse conditions there was no more distortion than would have been apparent in shoes containing high grade natural leather in the vamp.

A further advantage of my two-step vulcanizing process is that smaller quantities than usual of ultra-accelerator may be used in the first step, thereby reducing the changes which may occur in the vulcanized latex during storage. Vulcanized latex used as soon as prepared may give different products than does vulcanized latex, say, four or five days old, in which the presence of the excess accelerator has caused a continued vulcanization. This may be the explanation for some of the variation in results in past practice, especially in view of the fact that vulcanized latex is hardly ever used immediately after it has been prepared, it being generally desirable always to keep on hand a supply sufficient to ensure continuous operation.

In securing the tabulated results hereinbefore given, the web used as the carrier sheet for the vulcanized, dispersed rubber was one which consisted of loosely interfelted, bleached wood pulp of high alpha cellulose content, fabricated on machinery of the paper-making type, but the improvement afforded by my invention also inures in greater or less degree to bibulous webs and other porous objects of various descriptions. By "permanent set," as therein used, is meant the permanent elongation when a sample of artificial leather was stretched to the breaking point. The "flexing qualities" were determined by subjecting specimens of the leather to flexing or folding under conditions simulating those obtaining when the vamp portion of a shoe is worn on the foot. In determining the "ratio of wet to dry tensile strength," the samples for the wet tests were soaked over night in water at room temperature, and then were immediately tested for tensile strength in the usual way. In determining the "ageing qualities," the samples were placed in an oven at 70° C., through which a small stream of fresh air was continuously circulated for periods from one to three weeks, whereupon the specimens thus aged under accelerated conditions were examined for various physical characteristics.

I claim:

1. A process which comprises partially vulcanizing an aqueous rubber dispersion, mixing additional vulcanizing ingredients into the dispersion, impregnating a porous object with the dispersion, and causing further vulcanizing reaction to ensue in the rubber through said additional ingredients in situ in said object.

2. A process which comprises partially vulcanizing latex, mixing additional vulcanizing ingredients into said latex, impregnating a fibrous sheet with the latex, and drying and further vulcanizing the latex in situ in the sheet.

3. A process which comprises partially vulcanizing latex, mixing additional vulcanizing ingredients into said latex, impregnating a web of interfelted fiber with the latex, and heat-drying the web to further vulcanization of the rubber in situ in the web.

4. A process which comprises mixing vulcanizing ingredients, including sulphur, zinc oxide, and an accelerator, into latex in amount to effect a cure consistent with substantially no coagulation, effecting such a cure, then mixing additional similar vulcanizing ingredients into the cured latex, impregnating a web of interfelted fiber with the latex, and heat-drying the web to further vulcanization of the rubber in situ in the web.

MILTON O. SCHUR.